FREDERIC FUA
INVENTOR.

BY John J. Logan
ATTORNEY

Patented Nov. 21, 1950

2,530,517

UNITED STATES PATENT OFFICE 2,530,517

X-RAY TESTING AND MEASURING METHOD AND APPARATUS

Frédéric Fua, New York, N. Y., assignor to X-Ray Electronic Corporation, New York, N. Y., a corporation of New York Application November 1, 1944, Serial No. 561,361

3 Claims. (Cl. 250—83.6)

This invention relates to X-ray devices and more especially to such systems using electron tube amplifiers controlled by an X-ray beam.

A principal object of the invention is to provide a more sensitive system for testing by means of penetrating radiations such as X-rays and the like.

Another principal object is to provide a specially designed testing system using X-rays, wherein the response to the X-ray excitation can be amplified with great stability and sensitivity.

The invention comprises broadly the method of impressing regularly recurrent variations on a beam of X-ray which includes the step of moving across the beam a variable thickness X-ray interceptor having an imperforate surface and a thickness varying according to a predetermined wave shape.

A feature of the invention is the provision of a rotating disc having an imperforate wave shaped surface interposed in the X-ray beam of an electronic X-ray detection system.

Another feature relates to a method of using an X-ray tube as a testing source in conjunction with a stable alternating current electron tube amplifier.

A still further feature relates to the novel organization, arrangement and relative location of parts which cooperate to produce an improved and more sensitive X-ray measuring and testing system.

Other features and advantages not specifically enumerated will be apparent after a consideration of the following detailed description and the appended claims.

In the drawing which illustrates certain embodiments,

Figure 1:
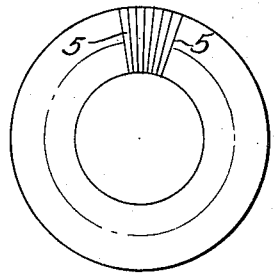
Fig. 1 is a plan view of an imperforate rotating disc for use according to the invention.
Figure 2:
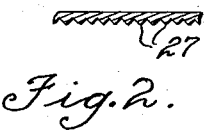
Fig. 2 is a section on the line 5—5 of Fig. 1.
Figure 3:
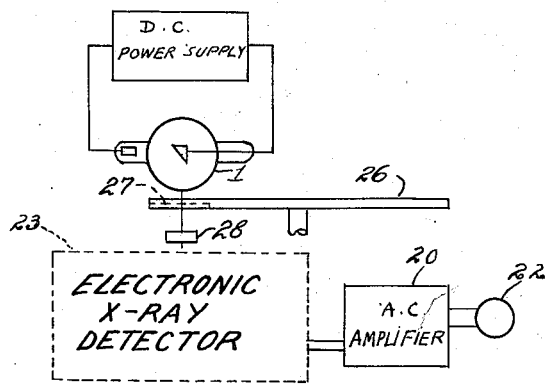
Fig. 3 is a diagrammatic illustration of an electronic X-ray detection system according to the invention.

In a system according to the invention, as shown in Fig. 3, the X-ray tube may be energized by a substantially pure D. C. power supply. In this system, the X-ray beam, instead of passing directly into the detector device 23, is first subjected to a regularly recurrent modulation by means of a constantly running metal disc 26 having an imperforate surface and a series of waveshaped notches 27 adjacent its circumferential margin, the disc being mounted so that the X-ray beam from the tube 1 passes through the marginal notches 27 the unperforated portion of the disc 24 between successive holes. After passing through the modulating disc 26 the X-ray beam penetrates the test piece 28 of material under examination and impinges on the X-ray sensitive electronic detector 23. The X-ray detector device 23 may be any of the various such devices having an electronic action, i. e. producing an electric current signal in response to the impinging X-ray. For example, photocells, ionization chambers or Geiger-Müller counters may be employed as detectors. The output of the detector is fed to an A. C. amplifier 20 and the output of that amplifier is applied to a suitable calibrated meter or indicator 22. It will be understood of course, that with this arrangement the disc 26 can be rotated so as to inject any desired A. C. component into the X-ray beam.

According to the invention, the wedge or waveshaped grooves 27 can be designed to provide a known law of regularly recurrent variation in the intensity of the X-ray beams which reach the test article 28. For example, the notches 27 can be shaped to impart a sine wave variation in the intensity of the X-ray beam.

It will be apparent that the frequency of the alternating component imparted to the X-ray beam is determined by the speed of rotation of the disc 26. If desired, this may be a frequency which is well removed from any disturbing frequencies. For example, if a frequency of 25 cycles is imparted to the X-ray beam alternating component, the equipment may be used quite close to powerful 60 cycle sources without introducing disturbances. In this event, of course, the amplifier 20 will be designed to have a band pass characteristic between 20 and 30 cycles and, if desired, with a rejection filter for the 60 cycles.

While certain specific embodiments have been disclosed herein, various changes and modifications may be made without departing from the spirit and scope of the invention.

What I claim is:

1. Apparatus for the testing of material by the measurement of X-ray penetrating the material including, in combination, a source of an X-ray beam, means for interposing the material to be tested in the path of said beam, an X-ray detector in the path of said beam beyond said material from said source producing electric signals varying in amplitude with variations in amplitudes of the impinging X-ray, a continuously moving X-ray interceptor in the X-ray beam between said source and said detector having regularly and smoothly recurrent variations of absorption power, a highly selective alternating current amplifier tuned to have a very narrow band-pass corresponding to the frequency of said regularly recurrent amplitude variations receiving the signals from said detector as input, and a quantitatively calibrated meter for measuring the output of said amplifier.

2. Apparatus for the testing of material by the measurement of X-ray penetrating the material including, in combination, a source of an X-ray beam, means for interposing the material to be tested in the path of said beam, an X-ray detector in the path of said beam beyond said material from said source producing electric signals varying in amplitude with variations in amplitude of the impinging X-ray, a continuously rotating disc having an imperforate, wave-shaped surface interposed in the X-ray beam between said source and said detector, a highly selective alternating current amplifier tuned to have a very narrow band-pass corresponding to a frequency with which successive wave crests on said disc pass a fixed point receiving the signals from said detector as input, and a quantitatively calibrated meter for measuring the output of said amplifier.

3. The method of impressing regularly recurrent variations on a beam of X-ray which includes the step of moving across the beam a variable thickness X-ray interceptor having an imperforate surface and a thickness varying according to a predetermined wave shape.

FRÉDÉRIC FUA.

REFERENCES CITED

The following references are of record in the file of this patent:

UNITED STATES PATENTS

| Number | Name | Date |
|---|---|---|
| 1,781,799 | Baird | Nov. 18, 1930 |
| 2,368,532 | Fearon | Jan. 30, 1935 |
| 2,092,814 | Schaffernicht | Sept. 14, 1937 |
| 2,094,318 | Faillo | Sept. 28, 1937 |
| 2,124,600 | Worrall | July 26, 1938 |
| 2,198,479 | Langmuir | Apr. 23, 1940 |
| 2,235,268 | Victoreen | Mar. 18, 1941 |
| 2,237,193 | Mobsby | Apr. 1, 1941 |
| 2,301,251 | Capen | Nov. 10, 1942 |
| 2,332,391 | McLachlan | Oct. 19, 1943 |
| 2,361,274 | Cravath | Oct. 24, 1944 |
| 2,361,389 | Fearon | Oct. 31, 1944 |
| 2,386,785 | Friedman | Oct. 16, 1945 |
| 2,401,288 | Morgan et al. | May 28, 1946 |